United States Patent
Kaessner

(10) Patent No.: US 8,926,012 B2
(45) Date of Patent: Jan. 6, 2015

(54) VEHICLE SEATS FOR VEHICLES

(75) Inventor: Dirk Kaessner, Kuemmersbruck (DE)

(73) Assignee: Grammer AG, Amberg (DE)

( * ) Notice: Subject to any disclaimer, the term of this patent is extended or adjusted under 35 U.S.C. 154(b) by 372 days.

(21) Appl. No.: 13/216,537

(22) Filed: Aug. 24, 2011

(65) Prior Publication Data

US 2012/0049602 A1 Mar. 1, 2012

(30) Foreign Application Priority Data

Nov. 16, 2010 (DE) .......................... 10 2010 051 326

(51) Int. Cl.
*B60N 2/42* (2006.01)
*B60N 2/427* (2006.01)

(52) U.S. Cl.
CPC .......... *B60N 2/4221* (2013.01); *B60N 2/42709* (2013.01); *B60N 2/4228* (2013.01)
USPC .................................. 297/216.2; 297/216.19

(58) Field of Classification Search
USPC ............... 297/216.2, 216.16, 216.17, 216.19; 296/68.1, 187.3
See application file for complete search history.

(56) References Cited

U.S. PATENT DOCUMENTS

| | | |
|---|---|---|
| 203,739 A | 5/1878 | Kilburn |
| 1,544,248 A | 6/1925 | Liebl |
| 1,607,164 A | 11/1926 | Leipert et al. |
| 1,945,801 A | 2/1934 | Briggs |
| 1,948,476 A | 2/1934 | Saurer |
| 2,489,981 A | 3/1946 | Rose |
| 2,559,105 A | 7/1951 | Banning, Jr. |
| 2,607,397 A | 8/1952 | Schneider |
| 2,686,667 A | 8/1954 | Willison et al. |
| 2,933,127 A * | 4/1960 | Brewster .................... 297/216.2 |
| 3,046,053 A | 7/1962 | Pearlstine |
| 3,134,568 A | 5/1964 | Carson |
| 3,208,085 A | 9/1965 | Grimshaw |
| 3,298,654 A | 1/1967 | Dome |

(Continued)

FOREIGN PATENT DOCUMENTS

| | | |
|---|---|---|
| DE | 1480465 | 1/1970 |
| DE | 1405350 | 3/1970 |

(Continued)

*Primary Examiner* — David E Allred
(74) *Attorney, Agent, or Firm* — Sheridan Ross P.C.

(57) ABSTRACT

The invention concerns a vehicle seat for a vehicle with a seating surface (10), a back rest (12) and at least one foot (14) supporting the seating surface (10), wherein the foot (14) is formed by a connecting means assembly (16) comprising two connecting means (18, 20), namely a first connecting means (18) and a second connecting means (20), each running/extending substantially horizontally, which are each coupled and held spaced in the vertical direction by means of two further connecting means (22, 24), namely a third connecting means (22) and a fourth connecting means (24), such that these four connecting means (18, 20, 22, 24) form a frame (26) which can be connected with the vehicle, and that at least one fifth connecting means is a deformation device (36), wherein the first connecting means (18) is arranged in the vertical direction above the second connecting means (20) and the third connecting means (22) is arranged in the vehicle longitudinal direction in front of the fourth connecting means (24). According to the invention, at least one fifth connecting means (36) which is a deformation device (36) is coupled with the frame (26) via a first connecting point (54) in the region of the first connecting means (18) and is coupled with the vehicle or frame via a second connecting point (56).

13 Claims, 7 Drawing Sheets

(56) References Cited

U.S. PATENT DOCUMENTS

Figure 3:
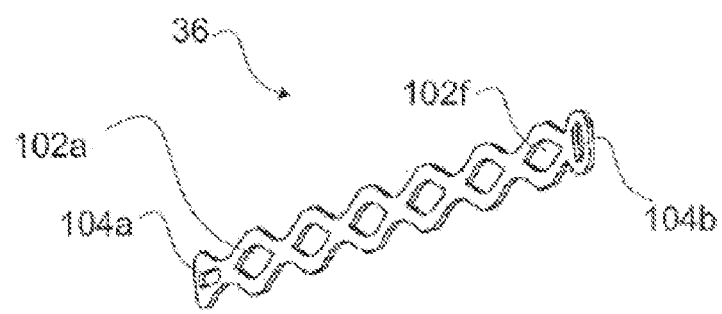

| | | | |
|---|---|---|---|
| 3,436,042 A | 4/1969 | Van Goubergen | |
| 3,578,376 A * | 5/1971 | Hasegawa et al. | 296/68.1 |
| 3,608,855 A | 9/1971 | Osenberg | |
| 3,697,128 A * | 10/1972 | Strien et al. | 297/216.2 |
| 3,724,603 A * | 4/1973 | Shiomi et al. | 188/371 |
| 3,756,556 A | 9/1973 | Georgi | |
| 3,788,697 A | 1/1974 | Barton et al. | |
| 3,802,737 A * | 4/1974 | Mertens | 297/216.2 |
| 3,847,338 A | 11/1974 | Adams | |
| 3,882,956 A | 5/1975 | Plegat | |
| 3,883,172 A | 5/1975 | Barton et al. | |
| 3,917,209 A | 11/1975 | Adams | |
| 4,002,315 A | 1/1977 | Van Goubergen | |
| 4,022,411 A | 5/1977 | Rumsey | |
| 4,183,492 A | 1/1980 | Meiller | |
| 4,257,626 A * | 3/1981 | Adomeit | 280/806 |
| 4,273,213 A | 6/1981 | Munz | |
| 4,349,167 A * | 9/1982 | Reilly | 244/122 R |
| 4,440,441 A * | 4/1984 | Marrujo et al. | 297/216.2 |
| 4,487,383 A * | 12/1984 | Mazelsky | 244/122 R |
| 4,500,076 A | 2/1985 | Rova | |
| 4,519,591 A | 5/1985 | Bush et al. | |
| 4,529,158 A | 7/1985 | Sautter, Jr. | |
| 4,678,155 A | 7/1987 | Carter | |
| 4,679,760 A | 7/1987 | Dotzler et al. | |
| 4,714,227 A | 12/1987 | Holm et al. | |
| 4,842,257 A | 6/1989 | Abu-Isa et al. | |
| 4,859,148 A | 8/1989 | Hibyan | |
| 4,911,381 A * | 3/1990 | Cannon et al. | 244/122 R |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A | 5/1991 | Kimura | |
| 5,054,753 A | 10/1991 | Polus | |
| 5,087,503 A | 2/1992 | Meatto | |
| 5,123,625 A | 6/1992 | Spaltofski | |
| 5,127,699 A | 7/1992 | Maezawa et al. | |
| 5,194,111 A | 3/1993 | Meatto | |
| 5,221,071 A | 6/1993 | Hill | |
| 5,222,709 A | 6/1993 | Culley, Jr. et al. | |
| 5,324,095 A * | 6/1994 | Yamauchi | 297/344.14 |
| 5,331,750 A | 7/1994 | Sasaki et al. | |
| 5,338,090 A * | 8/1994 | Simpson et al. | 297/216.2 |
| 5,344,210 A * | 9/1994 | Marwan et al. | 297/216.2 |
| 5,358,210 A | 10/1994 | Simon et al. | |
| 5,368,118 A | 11/1994 | Hoefle | |
| 5,437,494 A | 8/1995 | Beauvais | |
| 5,449,218 A | 9/1995 | Beauvais et al. | |
| 5,531,404 A * | 7/1996 | Marechal | 244/118.6 |
| 5,553,911 A | 9/1996 | Bodin et al. | |
| 5,555,501 A | 9/1996 | Furihata et al. | |
| 5,632,208 A | 5/1997 | Weber | |
| 5,651,585 A | 7/1997 | Van Duser | |
| 5,657,950 A * | 8/1997 | Han et al. | 244/122 R |
| 5,730,492 A * | 3/1998 | Warrick et al. | 297/216.2 |
| 5,743,592 A * | 4/1998 | Bedouch | 297/216.2 |
| 5,758,859 A | 6/1998 | Gonzalez | |
| 5,871,257 A | 2/1999 | Dundes, Sr. | |
| 5,899,288 A | 5/1999 | Schubert et al. | |
| 5,967,604 A * | 10/1999 | Yoshida et al. | 297/216.19 |
| H1833 H * | 2/2000 | Hoppel et al. | 296/68.1 |
| 6,286,821 B1 | 9/2001 | Schaffer | |
| 6,354,556 B1 | 3/2002 | Ritchie et al. | |
| 6,412,864 B1 * | 7/2002 | Larson | 297/216.2 |
| 6,478,102 B1 | 11/2002 | Puterbaugh et al. | |
| 6,582,015 B2 * | 6/2003 | Jessup et al. | 297/216.17 |
| 6,595,570 B2 * | 7/2003 | Susko | 296/68.1 |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,857,674 B2 | 2/2005 | Chareyre | |
| 7,017,888 B2 | 3/2006 | Platner et al. | |
| 7,044,553 B2 | 5/2006 | Ropp | |
| 7,077,226 B2 | 7/2006 | Oliver et al. | |
| 7,077,227 B2 | 7/2006 | Oliver et al. | |
| 7,080,881 B2 * | 7/2006 | Williamson et al. | 297/216.2 |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 | 3/2008 | Ropp | |
| 7,452,019 B1 | 11/2008 | Day | |
| 7,469,861 B2 | 12/2008 | Ferry et al. | |
| 7,478,879 B2 | 1/2009 | Robinson | |
| 7,744,149 B2 | 6/2010 | Murray et al. | |
| 7,882,914 B2 | 2/2011 | Scheele et al. | |
| 7,883,135 B2 * | 2/2011 | Ravid et al. | 296/68.1 |
| 7,950,726 B2 | 5/2011 | Brown | |
| 7,997,600 B2 | 8/2011 | Haller et al. | |
| 8,061,770 B2 * | 11/2011 | Houston et al. | 297/216.2 |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,226,163 B1 * | 7/2012 | Pearson et al. | 297/216.2 |
| 8,261,869 B2 | 9/2012 | Turco et al. | |
| 8,265,832 B2 | 9/2012 | Haller et al. | |
| 2002/0033622 A1 * | 3/2002 | Jarnail et al. | 297/216.2 |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2009/0045000 A1 | 2/2009 | Brown | |
| 2009/0205880 A1 | 8/2009 | Hammonds | |
| 2009/0284061 A1 | 11/2009 | Maier et al. | |
| 2010/0006364 A1 | 1/2010 | Koutsky et al. | |
| 2010/0213345 A1 | 8/2010 | Haller | |
| 2010/0276211 A1 | 11/2010 | Kolb et al. | |
| 2010/0289312 A1 | 11/2010 | Burr et al. | |
| 2011/0233975 A1 * | 9/2011 | Mindel et al. | 297/216.17 |
| 2012/0007293 A1 | 1/2012 | Bauer et al. | |
| 2012/0025577 A1 | 2/2012 | Kolb | |
| 2012/0032379 A1 | 2/2012 | Kolb | |
| 2012/0043798 A1 | 2/2012 | Haller et al. | |
| 2012/0133184 A1 | 5/2012 | Himmelhuber | |
| 2012/0145875 A1 | 6/2012 | Haller et al. | |
| 2012/0153551 A1 | 6/2012 | Kolb | |
| 2013/0069409 A1 | 3/2013 | Kolb | |

FOREIGN PATENT DOCUMENTS

| | | | |
|---|---|---|---|
| DE | 1480188 | 3/1970 | |
| DE | 2309808 | 9/1973 | |
| DE | 2317824 | 10/1973 | |
| DE | 7419891 | 10/1974 | |
| DE | 2537174 | 8/1975 | |
| DE | 7731339 | 1/1978 | |
| DE | 2816616 | 10/1979 | |
| DE | 141769 | 5/1980 | |
| DE | 3003175 | 8/1981 | |
| DE | 3208680 | 3/1982 | |
| DE | 3237167 A1 * | 4/1984 | B60N 1/00 |
| DE | 3517345 | 11/1986 | |
| DE | 3890533 | 10/1989 | |
| DE | 3901898 | 7/1990 | |
| DE | 9312640 | 1/1994 | |
| DE | 19907658 | 2/1999 | |
| DE | 19744199 | 4/1999 | |
| DE | 19919697 | 11/2000 | |
| DE | 19945841 | 4/2001 | |
| DE | 10129127 | 1/2003 | |
| DE | 10206223 | 9/2003 | |
| DE | 10300876 | 7/2004 | |
| DE | 102005028725 | 1/2005 | |
| DE | 102005023088 | 6/2006 | |
| DE | 60304643 | 4/2007 | |
| DE | 102006030008 | 4/2007 | |
| DE | 102008063812 | 4/2007 | |
| DE | 112006002984 | 10/2008 | |
| DE | 102007027320 | 1/2009 | |
| DE | 102008023120 | 5/2010 | |
| EP | 0284365 | 9/1988 | |

(56) References Cited

FOREIGN PATENT DOCUMENTS

| | | |
|---|---|---|
| EP | 1400398 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 | 11/2007 |
| WO | WO 92/04224 | 3/1992 |
| WO | WO 92/09451 | 6/1992 |
| WO | WO 98/32627 | 7/1998 |
| WO | WO 03/063650 | 8/2003 |
| WO | WO 2007/058572 | 5/2007 |

* cited by examiner

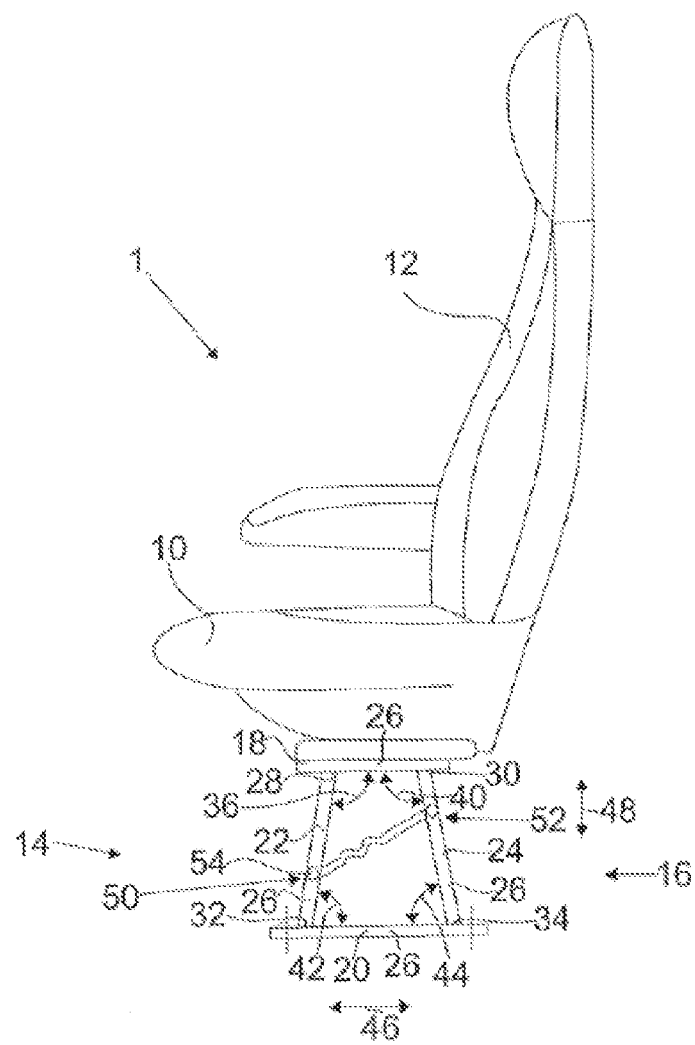
Fig. 1
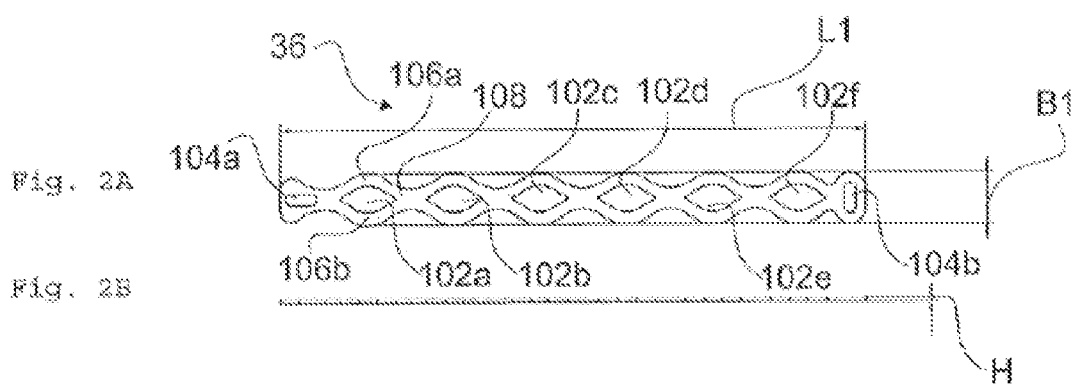
Fig. 2A
Fig. 2B

VEHICLE SEATS FOR VEHICLES

CROSS REFERENCE TO RELATED APPLICATIONS

This application claims the benefit of German Patent Application No. 102010035996.3 filed Aug. 31, 2010, and German Patent Application No. 102010051326.1 filed Nov. 16, 2010, the entire disclosures of each of which are incorporated herein by reference.

The invention concerns a vehicle seat for trucks, buses, cars, tractors, ships, working machines e.g. construction machinery and forklift trucks, rail vehicles or aircraft or similar. The vehicle seat can for example be intended for the driver of such a transport medium or for a passenger in the conventional sense i.e. a person carried by such a transport medium without controlling it.

Passenger seats are known from high speed trains which have a seating surface, a back rest and a foot to support the seating surface or unit of seating surface and back rest on the floor of the train. The seating surface and back rest usually have a relatively hard supporting "core" covered by upholstery. The construction here referred to as the core can be designed in principle in widely varying ways, for example having plates, webs or similar. The back rest is often designed in relation to the seating surface so that in particular the angle of the back rest to the seating surface can be altered. When the back rest is in the selected position, it is usually relatively rigidly connected with or arranged in relation to the seat. The foot is normally formed by one—or two spaced in the transverse seat direction—plate or column-like element(s), which runs or run substantially vertical or angled to the vertical direction to keep the seating surface at a distance from the floor of the train, and on the bottom of which is formed a carrier running in the seat longitudinal direction i.e. in the direction of view of a passenger sitting on the seat. This carrier serves for more stable support and mounting of the passenger seat on the floor of the train or train carriage. Furthermore in such known seats, the foot, on its upper end facing the seating surface, of the or each of the plate or column-like elements can comprise a further carrier or plate or similar which is moulded on the column-like element concerned and extends substantially horizontally to form a support and mounting area of the seating surface. The foot is attached to the floor of the train and to the seat by means of bolts or similar. The column or plate-like element(s) with the carrier(s) or plate(s) serving as support and mounting area(s) for the seating surface, and the carrier(s) provided for support or connection to the floor, can be formed as one-piece solid castings.

Known passenger seats, in particular of the said type, at least when firmly attached or bolted to the floor of the train, form as a whole relatively hard rigid units which can thus constitute a not inconsiderable risk of injury to passengers in the event of a crash or accident of the train. For example there is the danger that in the event of a crash or accident, passengers flung through the train at high speed will collide with such a seat and since this is formed as rigid inflexible obstacle, suffer substantial injury from this. Furthermore for example a passenger sitting on a rear seat can suffer substantial knee injuries if, in the event of a crash or accident of the train, his knees hit the back of a seat in front. In particularly hard impact situations there can even be the risk that the seat can be torn out of its floor anchoring and flung as a whole through the train.

In this context the invention is based on the object of creating a vehicle seat for vehicles such as e.g. road vehicles, in particular trucks, rail vehicles, watercraft or aircraft, such that the risk or severity of injury to persons in the event of a crash or accident of the vehicle is reduced.

According to the invention a vehicle seat is proposed according to claim 1. Further refinements are the object of the sub-claims.

According to the invention a vehicle seat is provided such as in particular for trucks with a seating surface, a back rest and at least one foot supporting the seating surface or seating surface and back rest. The foot is formed by a connecting means assembly comprising two connecting means, namely a first connecting means and a second connecting means, each running substantially horizontally and coupled together and held spaced in the vertical direction by means of two further connecting means, namely a third connecting means and a fourth connecting means, such that these four connecting means form a frame that can be connected with the vehicle, and that at least one fifth connecting means is provided which is a deformation device, wherein the first connecting means is arranged in the vertical direction above the second connecting means and the third connecting means is arranged in the vehicle longitudinal direction in front of the fourth connecting means.

According to the invention at least the deformation device is coupled via a first connecting point in the region of the first connecting means with the frame or seat portion and via the second connecting point with the vehicle, in particular the vehicle frame, or the frame i.e. the frame forming the foot. The phrase "in the region of the first connecting means" means preferably all positions which physically are arranged closer to the first connecting means than the second connecting means.

According to a further preferred embodiment of the present invention the first four connecting means can preferably be formed as webs, in particular curved webs, wherein it is also conceivable that the third and fourth connecting means can be formed as plates or webs, in particular curved and preferably S-shaped and/or U-shaped plates or webs. The first connecting means can also be designed as a web or plate, wherein it is also conceivable that the first connecting means is a seat portion or part of a seat portion or is arranged in the region of a seat portion. The second connecting means can also be designed as a web or plate, wherein it is also conceivable that can be understood as part of the vehicle frame or separating the lower ends of the third and fourth connecting means, respectively. The terms "plate/s" and "web/s" below can preferably be interchangeable and describe each particularly preferably connecting means. It is furthermore conceivable that the second, third and fourth connecting means form one-piece and preferably multipiece, in particular three-piece, part frame assemblies to receive the first connecting means, in particular a frame portion and preferably a seat portion of the vehicle seat constituting a frame portion. The deformation device is preferably formed longish at least in sections and particularly preferably inclined or parallel or substantially parallel to the horizontal direction. The horizontal direction is in particular the direction or a direction which extends substantially parallel to the vehicle floor or the ground surface when the vehicle seat is mounted in the vehicle. The deformation device extends inside or in sections or completely outside the frame formed by said four connecting means. This relates in particular to a side view of the frame. The deformation device can for example extend inside or outside the frame such that—in particular in said side view—it is arranged completely inside or outside the frame or so that in its two end regions it forms an intersection with the frame—in particular in said side view—or so that in one of its two end regions it forms an intersection with the frame—in particular in said side view—and is arranged completely inside the frame viewed in the direction of the other end. The deformation device is preferably coupled with the frame in at least one of its two end regions, wherein one end region of the deformation device is also connected with the vehicle, in particular the vehicle frame. The corresponding coupling points via which the deformation device is coupled with the frame can for example be weld joints or pivot joints.

It can be provided that the webs of the frame with which the deformation device is coupled carry protruding flanges for this coupling, via which the deformation device is coupled to the frame.

The deformation device(s) can for example be iron strips, steel strips, secondary straps, strap belts, rubber straps, leather straps, chain belts, linked belts, Bowden cables, wire cables, gas springs, hydraulic springs, pneumatic springs, fluid springs, metal springs, dampers, metal profiles, plastic elements, castings, hinges, active systems, tensioner systems (e.g. belt tensioners/pyrotechnic systems), electric motors, linear guides, adjustment rails, similar and/or combinations thereof.

According to a further preferred embodiment, between its coupling points with which it is coupled to the frame and/or vehicle, the deformation device has at least one first section in which it preferably has a hole and particularly preferably a multiplicity of holes arranged in succession in the longitudinal direction of the deformation device, the shape of which holes can be modified on transition from a main configuration into a deformation configuration.

This is advantageous since for example in the case of a flat deformation device, rapid and process-secure production is possible by a punching process from a flat material. This also leads to a low tooling cost. In addition in the first section the deformation device can be folded or curved or bent or kinked or particularly preferably flat.

The deformation device in the deformation configuration is longer than in the main configuration. This is advantageous as energy is absorbed by the distortion of the deformation device, and hence the effects of an accident on the vehicle seat user are reduced.

In a further preferred embodiment the second connecting point is arranged or provided outside the frame formed by the first connecting means, second connecting means, third connecting means and fourth connecting means.

This embodiment is advantageous as the deformation device on one side is connected with the vehicle frame and hence to an extremely rigid structure, which allows the deformation device to deform as a function of the relative movement of the vehicle seat or portion of the vehicle seat in relation to the vehicle frame, in particular when exposed to forces of compression, tension, torsion and/or bending.

Furthermore it is conceivable that the deformation device, which can also be designated a protection element, is arranged as an integral solution behind, in front of or between the connecting means or the arrangement can be freely selectable on the vehicle structure or vehicle frame. Deformation devices arranged behind or in the rear region of the vehicle seat are preferably formed as tension elements e.g. elements under tension loading, and the deformation devices arranged in front of or in the front region of the vehicle seat are preferably compression elements. It is also conceivable that in the centre area of the vehicle seat (in the longitudinal direction) are arranged deformation elements which can be loaded with compression and/or tension. The arrangement of several deformation elements of the same or different type is also conceivable, wherein preferably deformation devices are provided only in the front region or only in the rear region of the vehicle seat, or in the front, rear and/or centre region.

It is furthermore conceivable that the holes are similar in form i.e. preferably can have substantially the same form but different sizes or length-width-height ratios. As well as visual benefits, this has a substantial effect on production costs as the deformation device can be produced without resetting tools. It is here conceivable that the holes are generated by punching. It is however also possible that two or more wave-like components are connected together such that firstly the wave dips are opposite each other i.e. preferably have maximum spacing from each other, and secondly the wave peaks lie against or on each other. The wave peaks are preferably connected together by form fit and/or material fit. For example such a connection can be achieved by bulging, spotting, welding and/or by screws or rivets. A further benefit of the present invention results in particular in the case of a one-sided, two-sided or multi-sided flat deformation device, since because of its flat form this only takes up a little space.

In a further preferred embodiment of the present invention the holes are formed at least partly in a spherical form, in particular an elliptical form. This embodiment is advantageous as the respective form of the holes allows setting of the movement of the deformation device on transition to the deformation configuration. Also a spherical or elliptical form is particularly advantageous as it achieves as efficient as possible a distribution of the force flow, whereby the strength of the deformation device in relation to its weight is increased in comparison with a deformation device of a different shape.

It is furthermore conceivable that the holes are arranged in succession and spaced apart in the longitudinal direction of the deformation device. This is advantageous as thus the forces applied in the form of tension to the deformation device can be absorbed extremely efficiently by plastic distortion of the deformation device. It is furthermore conceivable that an arbitrary number of holes is provided or that for example 2 to 30 holes are provided, preferably however 3 to 25 holes, and particularly preferably 4 to 20 holes. The hole width, height e.g. sheet thickness, and hole length can preferably have an arbitrary relationship to each other. It is furthermore conceivable that several rows of holes are provided arranged in succession, wherein the individual rows can also be arranged offset to each other in the longitudinal direction of the deformation device. It is here conceivable that an arbitrary number of rows is provided next to each other or that for example 2 to 8 rows, preferably 3 to 7 rows and particularly preferably 4 to 6 rows are arranged next to each other. Furthermore it is possible that several deformation devices can be arranged interlaced or arranged in series and/or parallel to each other or above each other, in particular in layers.

In a further preferred embodiment of the present invention the deformation device in its end regions has slot-like coupling regions for coupling with the frame and/or the vehicle which are preferably arranged oriented similarly or particularly preferably differently. This embodiment is particularly advantageous for mounting of the deformation device and allows the deformation device to absorb the force flow preferably substantially in the longitudinal direction of the deformation device.

The first, second, third and fourth connecting means are preferably each formed straight, curved or bent. These four webs in particular substantially define a plane.

It is provided in particular that the first and second connecting means are coupled to the third and fourth connecting means respectively. The corresponding coupling points are in particular formed so that the coupling means adjacent or coupled together there are mobile relative to each other under a predetermined load acting on the foot. For this preferably the coupling points are formed such that the adjacent connecting means can, under a predetermined load acting on the foot, pivot relative to each other preferably through an angle greater than 5°, preferably greater than 10°, particularly preferably greater than 15°, preferably greater than 20°, preferably greater than 25°, preferably greater than 30°, preferably greater than 35°. In particular superposed on said pivoting movement or to enable this, it can also be provided that corresponding coupling points of the connecting means forming the frame are structured so that the respective sections of the connecting means adjacent or coupled together there, with which the two connecting means are coupled together, are mobile translationally relative to each other under a predetermined load acting on the foot. For example it can be provided that these sections adjacent in the region of the coupling point are mobile translationally, under a predetermined load acting on the foot, relative to each other through a distance which is greater than 1 cm, preferably greater than 2 cm, preferably greater than 3 cm, preferably greater than 5 cm, preferably greater than 8 cm, preferably greater than 10 cm, preferably greater than 15 cm, preferably greater than 20 cm. The relative mobility mentioned above as an example in various embodiments, for the connecting means of the frame under a predetermined load of the frame, is in particular such that the frame is sustained or the coupling, in the region of adjacent connecting means, of two connecting means of the frame is sustained, where in particular the mutual angular ratios of the frame or its connecting means change. Particularly preferably the frame forms a peripherally closed contour, wherein the coupling points of the connecting means forming the frame are structured such that on a relative movement of adjacent connecting means under a predetermined load, the frame remains peripherally closed. Preferably however the second connecting means is immobile in relation to the vehicle frame, in particular during an accident or if the predetermined load acts on the foot.

It is provided in particular that the deformation device distorts or stretches under a predetermined load acting on the frame, in particular plastically. This achieves in particular that the deformation device is stretched in its folded or curved or bent or angled or flat area, in particular under plastic distortion. This can in particular be such that the folded or curved or bent or angled or flat area of the deformation device concerned is stretched such that its course, in particular with a sustained predetermined load, increasingly approaches a narrower course. Any folded region can for example be unfolded increasingly. It is particularly provided that under a predetermined load acting on the foot, the spacing of such coupling or connecting points, at which the deformation device is coupled to the frame and/or vehicle, increases or reduces, in particular as a result of a corresponding deformation of the folded or curved or bent or angled or flat region of the deformation device concerned. It is provided in particular that under a predetermined load acting on the frame, these connecting means are moved relative to each other so that the at least one deformation device coupled to the frame is loaded under elongation and in particular deformed or stretched or unfolded accordingly. On such a relative movement of the connecting means of the frame, in particular also the unit of the seating surface and back rest is moved accordingly via the corresponding coupling with the feet.

The deformation device, or devices if a multiplicity thereof is provided, can act as a stop for the deformability of the frame or a stop to limit the relative mobility of the webs forming the frame. This can be such that the deformability exists as long as the deformation device under a predetermined load is not or not yet stretched such that it is straight or narrow or has reached its end configuration, and when the deformation device is straight or narrow it has preferably also reached the end configuration, and further deformation of the frame or further relative movement of the webs forming it is prevented or blocked by this deformation device.

It can for example be provided that an impact acting backward on the vehicle seat or a load or force of predetermined size acting backward on the passenger seat causes or can cause such a deformation of the frame and deformation device. For example it can be provided that a predetermined load or force of predetermined size acting backward on the vehicle seat at around knee height or a height of 35 to 70 cm, preferably 40 to 60 cm, preferably 45 to 55 cm, causes or can cause such a deformation of the frame and deformation device. It can be provided that the deformation of the frame and deformation device is achieved only if the force is greater than 3000 N, preferably greater than 3300 N, preferably greater than 3500 N, preferably greater than 3700 N, preferably greater than 4000 N. Such a trigger force can however also have a different size. Furthermore the foot can also be designed for a different force application point and for a corresponding force acting as a trigger force there.

For example in rail vehicles by means of a preferred embodiment of the invention it can be achieved that, as described above, a predetermined load or force of predetermined size acting at knee height or at a height of 35 to 70 cm, preferably 40 to 60 cm, preferably 45 to 55 cm above the floor of a wagon, such as a carriage of a rail vehicle, backward on the passenger seat causes or can cause such a deformation of the frame and deformation device that in the case of an accident or crash the severity of any knee injury of a person sitting behind (for example) a passenger seat according to the invention is reduced; this can for example be such that in the case that the knee impacts the passenger seat backward with a particular force, for example corresponding to the value ranges given above, the frame of the foot and the deformation device is deformed such that the seat deviates or deflects in the region of the impact point of the knee load.

Preferably the vehicle seat has precisely two or three, four or more feet of the said type arranged adjacent or spaced in the transverse direction of the vehicle seat, wherein for example the planes defined by the frame of the respective foot extend parallel to each other. It is however also conceivable that the seat has precisely one foot.

It can be provided that two deformation devices are arranged so that they cross.

In an advantageous embodiment the or at least one deformation device is connected to the frame in the region of diagonally opposed coupling points of adjacent connecting means of the frame. It can also be provided that the at least one deformation device is held on the frame at other points.

The deformation device can for example be or be made from a flat iron bar such as a perforated strip. It is however also conceivable that the deformation device is injection-moulded if e.g. is made of plastic or cast if e.g. made of a non-ferrous material.

The frame can for example be substantially rectangular, wherein it can be square or can have rectangle sides standing perpendicular to each other and of different lengths, preferably comprising curved or bent sections. The frame can for example also be trapezoid and in particular a symmetrical or asymmetrical trapezoid. It can be provided that with such a trapezoid, the horizontal side running facing the floor is longer than the horizontal side facing the seating surface of the vehicle seat. Furthermore it can be provided that the angle which the third or fourth connecting means encloses with the horizontal direction lies in a range of 45° to 85°, preferably in the range between 55° and 85°, preferably in the range between 65° and 85°, preferably in the range between 75° and 85°, wherein the angle allocated to the third connecting means can correspond to or differ from the angle allocated to the fourth connecting means. For example the rear connecting means or the connecting means facing the back rest in the seat longitudinal direction can enclose with the horizontal an angle of 83° and the front of the two connecting means can enclose an angle of 79° with the horizontal. The said forms of the frame and the corresponding angle data relate in particular to the unloaded or undeformed state of the foot.

It should be noted that the seat longitudinal direction runs horizontally perpendicular to the seat transverse direction.

Figure 4:
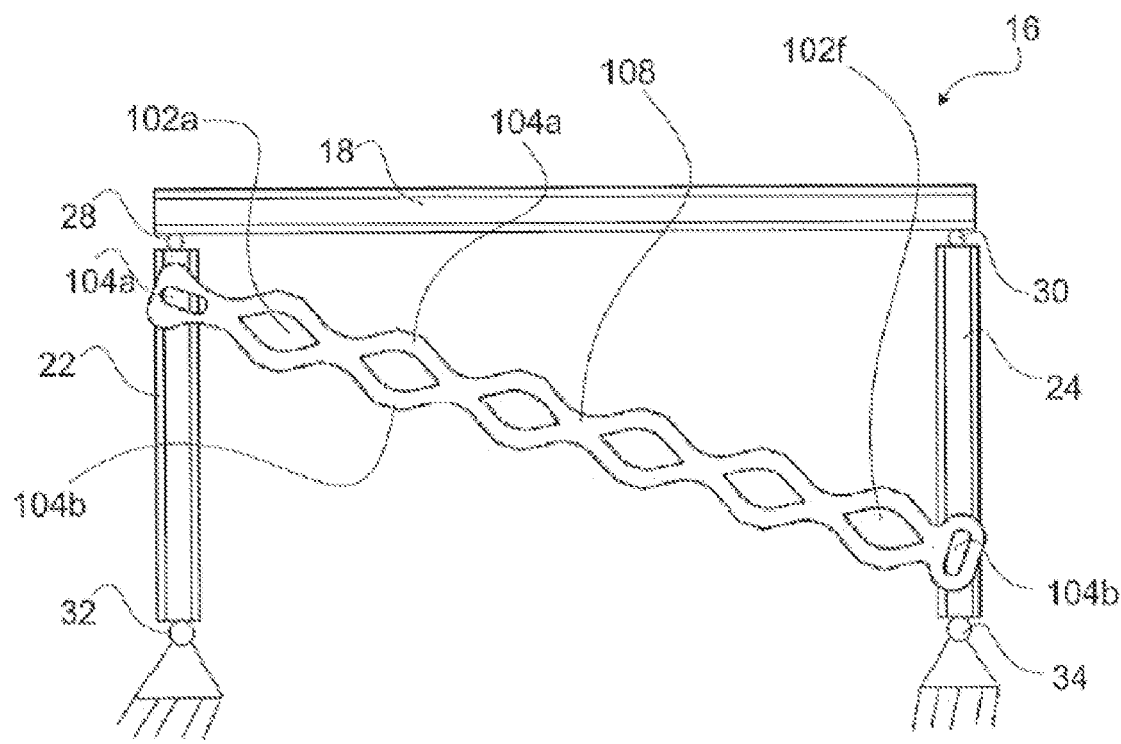
Figure 5:
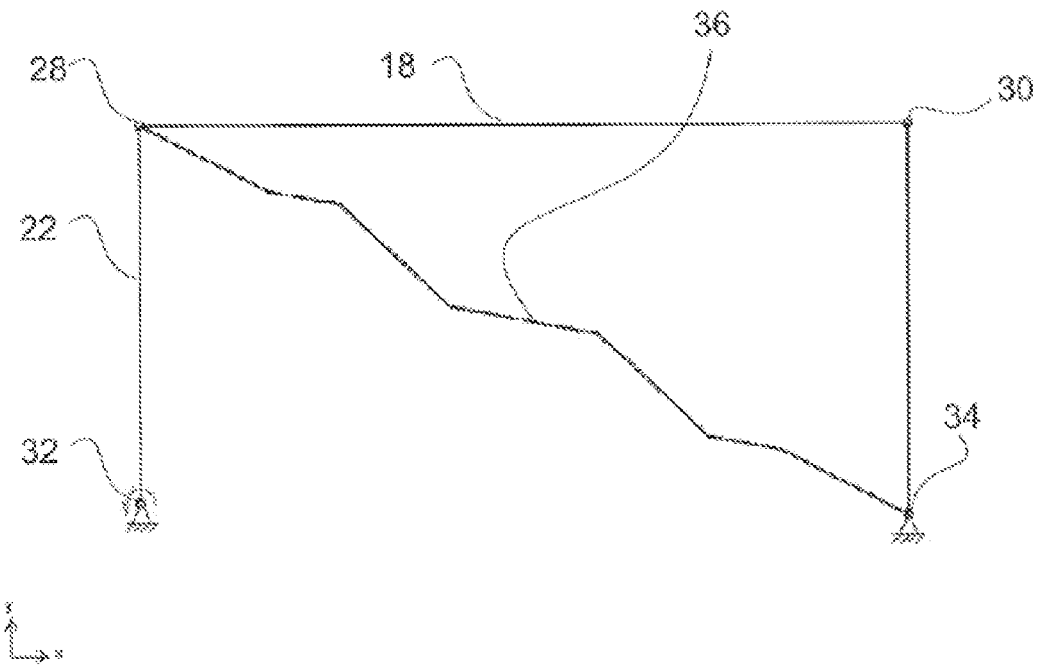
Figure 6:
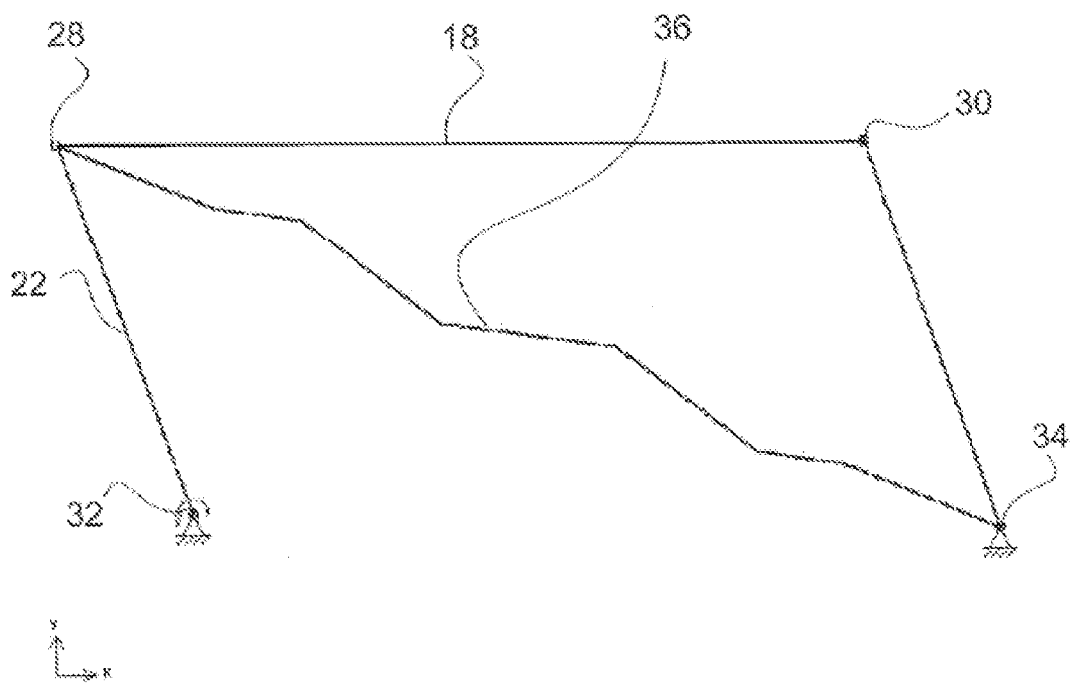
Figure 7A:
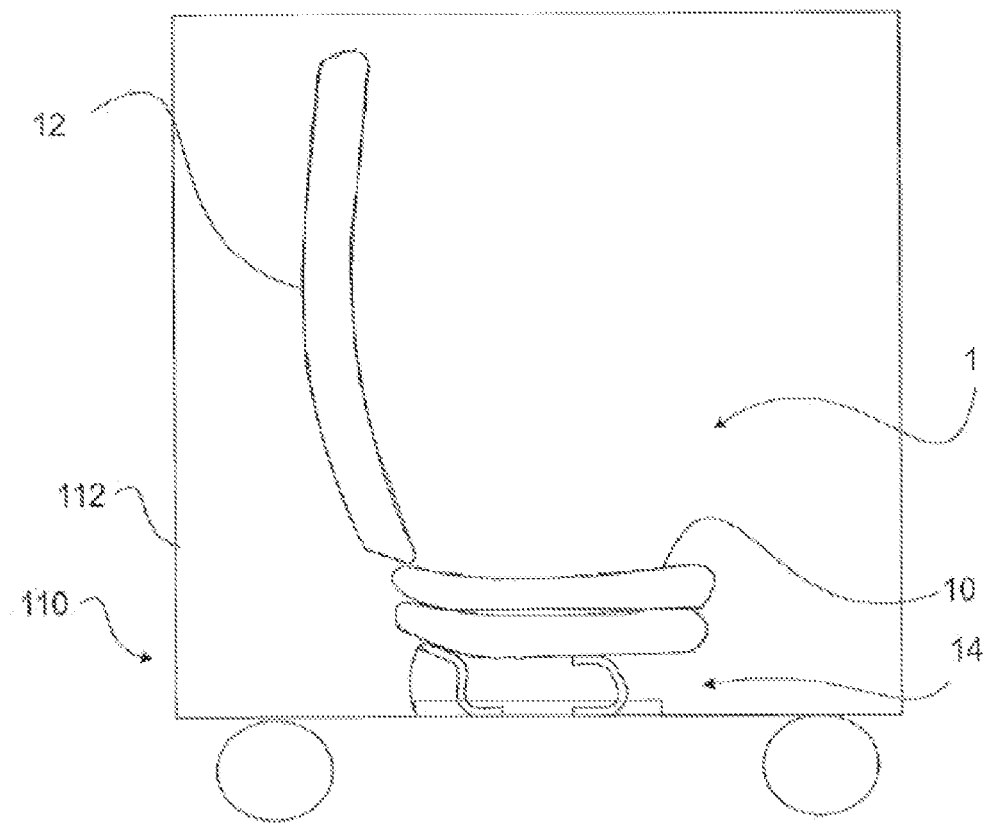
Figure 7B:
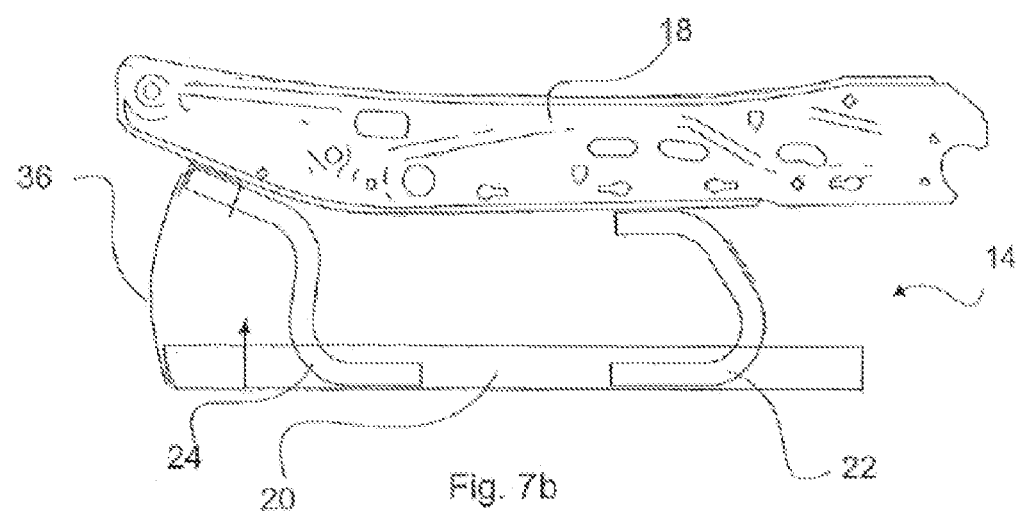
Figure 8A:
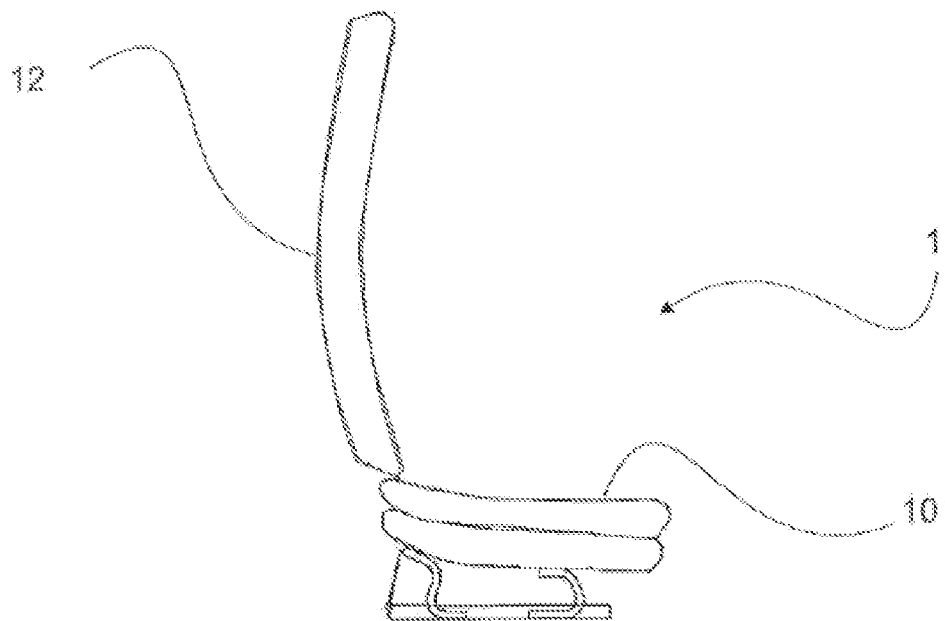
Figure 8B:
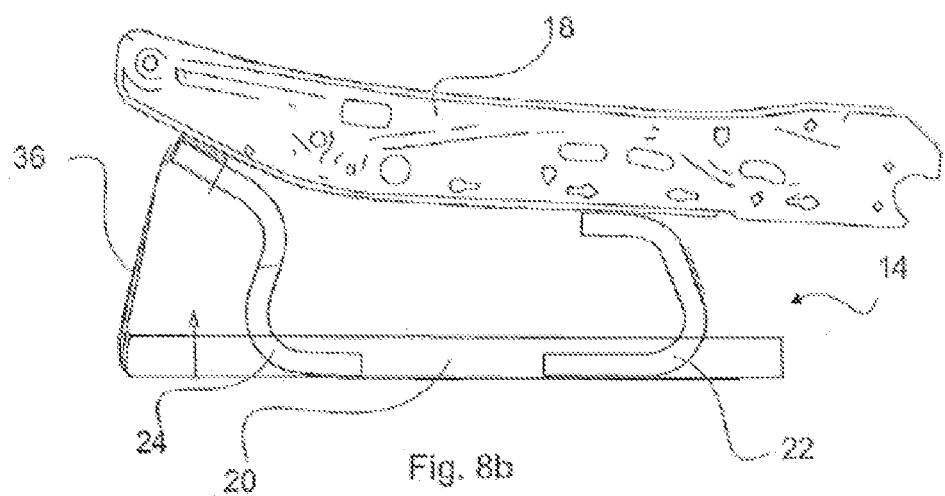
Figure 9A:
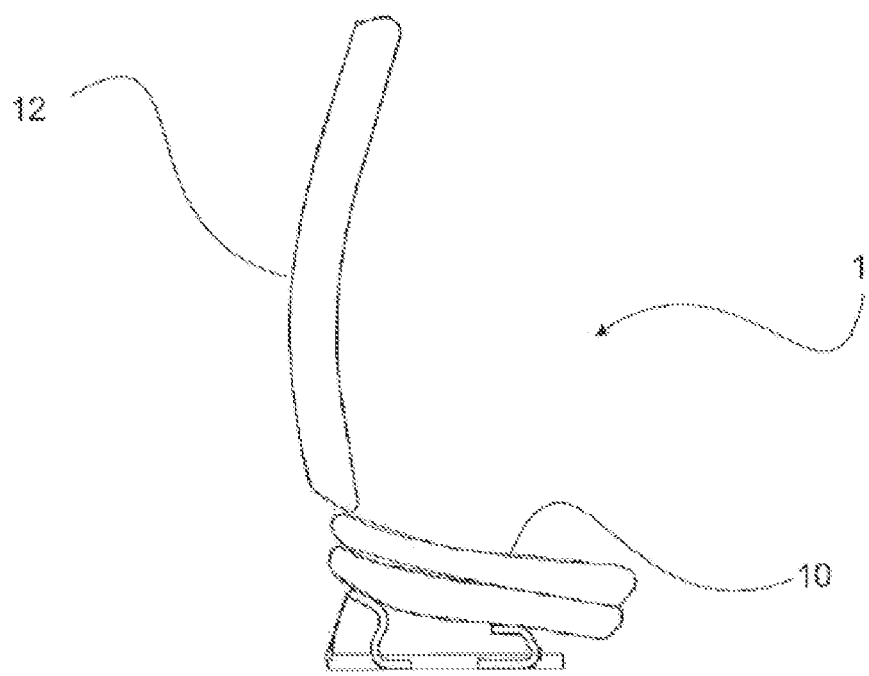
Figure 9B:
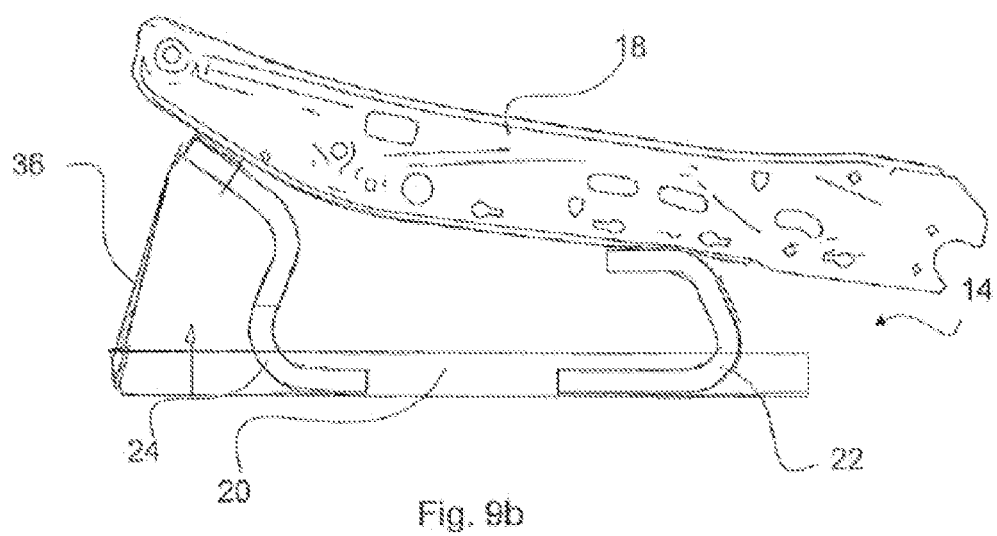
Figure 10:
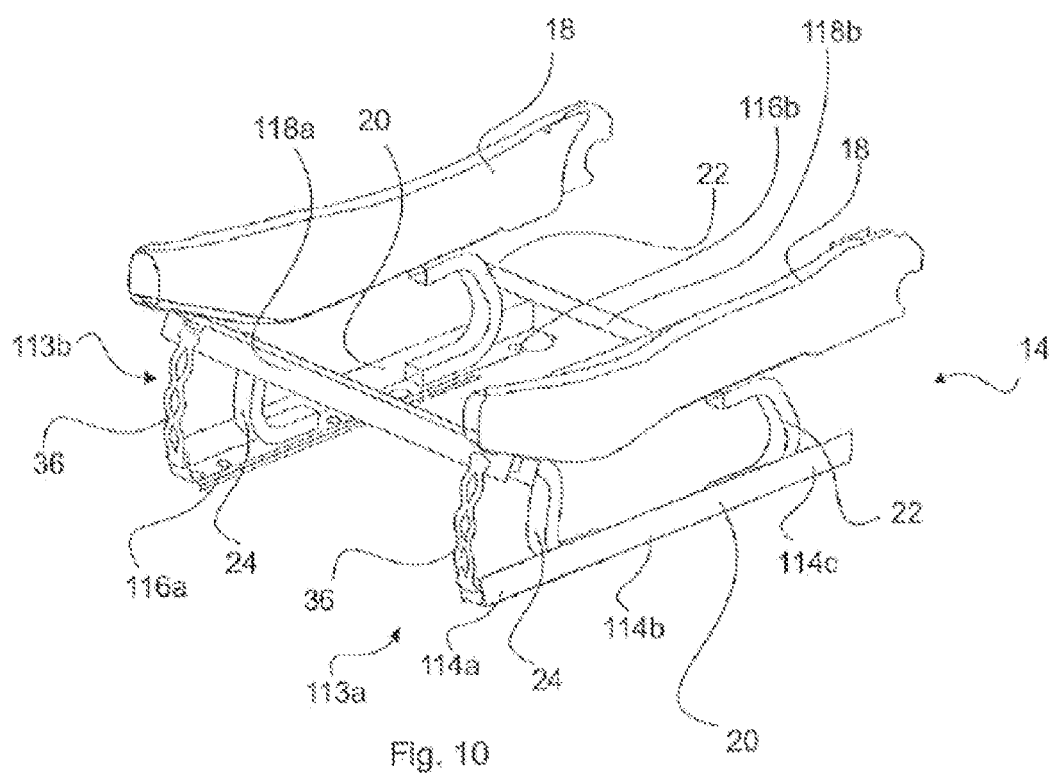

The invention will now be explained in more detail with reference to embodiment examples shown in the figures. These show:

FIG. 1 an example vehicle seat according to the invention in diagrammatic view;

FIG. 2*a* a two-dimensional top view of a deformation device according to the invention;

FIG. 2*b* a two-dimensional side view of a deformation device according to the invention;

FIG. 3 a three-dimensional depiction of the deformation device according to the invention;

FIG. 4 a two-dimensional depiction of the deformation device in fitted state;

FIG. 5 a diagrammatic depiction of the deformation device in the main configuration;

FIG. 6 a diagrammatic depiction of the deformation device in the deformation configuration;

FIG. 7*a* a two-dimensional depiction of a vehicle seat in a vehicle;

FIG. 7*b* a two-dimensional depiction of the lower part of the vehicle seat shown in FIG. 7*a* in a first state;

FIG. 8*a* a two-dimensional depiction of a vehicle seat in a second state;

FIG. 8*b* a two-dimensional depiction of the lower part of the vehicle seat shown in FIG. 7*a* in a second state;

FIG. 9*a* a two-dimensional depiction of a vehicle seat in a third state;

FIG. 9*b* a two-dimensional depiction of the lower part of the vehicle seat shown in FIG. 7*a* in a third state; and FIG. 10 a three-dimensional depiction of the seat lower part in a third state.

FIG. 1 shows a first embodiment example of a vehicle seat 1 according to the invention in diagrammatic view. This vehicle seat 1 can for example be mounted in a truck, on the floor of a wagon of a rail vehicle such as a high speed train, in particular ICE, or another vehicle. Several such vehicle seats 1 can be mounted in succession, depending on the space conditions available, in the manner of several rows of seats arranged behind each other or mounted on the floor of the wagon concerned.

The vehicle seat 1 has a seating surface 10, a back rest 12 and at least one foot 14. The seating surface 10 and back rest 12 can each have a core and an upholstery covering this on the top of the seating surface 10 and front of the back rest 12. Furthermore the seating surface 10 and back rest 12 can have an integral suspension offering better seating comfort.

The seating surface 10 extends substantially horizontally. The back rest 12 protrudes upward from the seating surface 10 at its rear end. It can be provided that the back rest 12, in particular in relation to its incline angle in relation to the seating surface 10, is adjustable in relation to the seating surface 10. For this a suitable adjustment device can be provided.

It should be noted that a vehicle seat 1 according to the invention and shown as an example can have several feet 14 in the manner shown in FIG. 1. Several such feet 14 can be arranged for example spaced apart and substantially parallel to each other. In relation to the vehicle seat 1 shown in FIG. 1, this can for example be such that two feet of said type are arranged next to each other or behind each other viewed perpendicular to the image plane. In other words several such feet can be arranged next to each other in the transverse direction of the vehicle seat. For example two such feet 14 can be provided to support the seating surface 10 or the unit of seating surface 10 and back rest 12.

The foot 14 according to FIG. 1 is formed by a web assembly 16. This web assembly 16 has a first web 18 and a second web 20. The first web 18 and the second web 20 run substantially horizontally and parallel to each other. In the vertical direction the first web 18 and the second web 20 are spaced from each other. The web assembly 16 furthermore has a third web 22 and a fourth web 24. By means of this third web 22 and fourth web 24, the first web 18 and second web 20 are spaced in the vertical direction. To this end the third web 22 and fourth web 24 are coupled firstly with the first web 18 and secondly with the web 20. The first web 18, second web 20, third web 22 and fourth web 24 form or define in cooperation a frame 26. This frame 26 as shown in FIG. 1 spans/defines a plane.

These corresponding coupling or connection points 28, 30, 32, 34 via which the third web 22 and fourth web 24 are coupled to the first web 18 and second web 20 respectively can for example be formed by pivot points. Such pivots can for example be such that they are substantially free to swivel; they can also however be such that they are fitted with a self-retaining mechanism such as for example a friction mechanism so that—in relation to each of these pivots—a minimum pre-specified moment must act about this pivot on each of the adjacent webs 18 and 22 or 18 and 20 or 20 and 22 or 20 and 24 in order to achieve a swiveling of the webs 18 and 22 or 18 and 24 or 20 and 22 or 20 and 24 in relation to each other.

These corresponding coupling or connecting points 28 or 30 or 32 or 34 of the adjacent webs 18 and 22 or 18 and 24 or 20 and 22 or 20 and 24 can furthermore be formed by weld points.

The coupling or connecting points 28 or 30 or 32 or 34 can furthermore for example be formed in the manner of linear guides; these can for example be such that on the first web 18 and second web 20 grooves or similar are provided in which the third web 22 and fourth web 24 engage with their ends, or engagement parts provided there. The grooves extend in particular on the side of the first web 18 and second web 20 facing the third web 22 and fourth web 24 respectively, in particular in the longitudinal direction of these webs 18, 20. It can be provided that the grooves have a substantially U-shaped or rectangular cross section. Particularly preferably the grooves however have an L- or T-shaped cross section wherein they form an undercut or back cut, and wherein the respective engagement parts of the third web 22 and fourth web 24 are each formed L- or T-shaped and engage in the corresponding grooves.

Combined with such coupling or connecting points 28 or 30 or 32 or 34 based on grooves or combined with the coupling or connecting points 28 or 30 or 32 or 34 based on swivel joints and mentioned above as an example, it may be provided that the webs 18 and 20 are additionally fixed with the webs 22 and 24 in the region of these grooves or pivots via weld points so that under a predetermined load, the weld points break or open and correspondingly by means of the longitudinal guides formed by the grooves or by means of the pivot point, in particular in cooperation with the at least one deformation device 36 discussed further below, the relative movement or relative swivel discussed further below of the webs 18, 20, 22, 24 forming the frame 26 is allowed or occurs under corresponding load, in particular without the webs of the frame 26 being separated from each other. The deformation device 36 here can have a retaining and/or damping effect. The coupling or connecting points 28 or 30 or 32 or 34 can however also be formed differently than explained above as an example.

It is provided in a suitable embodiment that the coupling or connecting points 28 or 30 or 32 or 34, in particular weld points 28 or 30 or 32 or 34, are formed such that, in particular within the plane spanned by this frame, they allow a shift or swivel of the frame 26 formed by webs 18, 20, 22, 24 such that the angle 38, 40, 42, 44 formed between adjacent webs 16 and 20 or 16 and 22 or 18 and 20 or 18 and 24 changes or can change in particular under a predetermined load, without the adjacent webs 16 and 20 or 16 and 22 or 18 and 20 or 18 and 24 being separated from each other in the region of the coupling or connecting points 28 or 30 or 32 or 34 or without the coupling or connecting points 28 or 30 or 32 or 34 opening or being destroyed or breaking. It should be noted that in this context however with the example designs for coupling or connecting points 28 or 30 or 32 or 34 at which one or more weld points break under predetermined load and hence allow the relative movement of webs 16 and 20 or 16 and 22 or 18 and 20 or 18 and 24 coupled together additionally by means of a pivot or a linear guide, a non-breaking or non-opening or non-destruction evidently relates to the associated pivot or linear guide connection or coupling and not to the weld points.

It is furthermore to be noted that the foot 14 as a whole i.e. at least in collaboration of webs 18, 20, 22, 24 with the at least one deformation device 36 evidently has a supporting effect for the seating surface 10 or the unit of seating surface 10 and back rest 12, even if the seating surface 10 is loaded by a passenger seated thereon. For example it can be provided that the foot 14 can withstand a load from above which is greater than 2000 N, preferably greater than 2500 N, preferably greater than 3000 N, preferably greater than 3500 N, preferably greater than 4000 N, preferably greater than 5000 N, preferably greater than 6000 N, preferably greater than 8000 N, preferably greater than 10,000 N, and in particular without causing said relative movement or shift or said swivel of the frame 26 or its webs 18, 20, 22, 24.

As already stated the foot 14 furthermore has at least one deformation device 36. The deformation device 36 extends inclined to the horizontal direction 46 and inclined to the vertical direction 48. The deformation device 36 extends preferably only within the frame 26 and is coupled at its two end regions 50, 52 with the frame 26, for example coupled pivoting or welded. Between the coupling points 54, 56 by means of which the deformation device 36 is coupled to the frame 26, the deformation device 36 has at least one first section 58 in which it is folded or curved or bent or kinked or in particularly preferably runs flat.

In the design according to FIG. 1 the seat 1 or foot 14 is shown in a position before a crash. The frame 26 here has a trapezoid form.

In the design according to FIG. 1 the deformation device 36 is structured such that its front coupling point 54 or coupling points 54 in the viewing direction of a person seated on the vehicle seat 1 with his back against the back rest 12, is or are positioned below the rear coupling point 56 or coupling points 56; instead the deformation device 36 or devices 36 can be positioned so that the rear coupling point(s) 56 is or are positioned below the front coupling point(s) 54. Also crossing deformation devices 36 can be provided in an alternative design.

FIGS. 2a and 2b show a deformation device 36 which preferably extends at least partly substantially flat and preferably completely flat. The deformation device 36 has a length L1 and width B1, where L1 is preferably many times greater than B1. Furthermore the deformation device 36 has a height H which preferably constitutes a fraction of width B1. On a transition of the deformation device 36 from the main configuration into a deformation configuration, there is preferably an increase in length L1 and at least in portions a reduction in width B1. The deformation device 36, as well as a multiplicity of preferably elliptical or droplet-shaped holes 102a-f, particularly preferably has in its end regions coupling devices 104a and 104b which can be connected to the coupling means formed on the web assembly 16. The coupling devices 104a and 104b which preferably have partially straight or curved slots, are connected with the web assembly 16 in the regions of connecting points 28 and 34, in particular at connecting points 28 and 34 and/or at one of the webs 22 or 18 or one of the webs 24 or 20. The holes 102a-f are preferably surrounded substantially by two wall areas 106a, 106b and spaced apart in length direction L1 by intermediate regions 108. The wall areas 106a, 106b preferably form a one-piece or connected structure in the intermediate region 108.

FIG. 3 shows the deformation device 36 shown in FIGS. 2a and 2b in a perspective view.

FIG. 4 shows the deformation device 36 shown in FIGS. 2a, 2b, and 3 arranged on the web assembly 16. The web 20 is not shown in this view but is formed by the preferably stationary arrangement of connecting points 32 and 34.

FIG. 5 shows a diagrammatic depiction of web assembly 16 and deformation device 36 in the main configuration. The web assembly 16 in this depiction or configuration is a parallelogram in the form of a rectangle and the deformation device 36 extends diagonally from the area of the coupling or connecting point 34 to the coupling or connecting point 28.

FIG. 6 shows a further diagrammatic depiction of the web assembly 16 and deformation device 36 in deformation configuration. The web assembly 16 in this depiction is shown in the form of a lozenge, whereby the distance between the coupling or connecting points 28 and 34 is extended in comparison with the main configuration shown in FIG. 5. Finally this leads to a distortion of the deformation device 36 on deflection of the web assembly 16, for example on rotation of the web assembly 16 about the coupling or connecting device 32 as a consequence of an accident, whereby kinetic energy is absorbed because of the plastic distortion of the deformation device 36.

FIG. 7a shows a further embodiment of the vehicle seat 1 according to the invention. The vehicle seat 1 in this depiction is arranged inside a vehicle 110 and connected with the vehicle frame 112. The vehicle seat 1 has a back rest 12 and a seating surface 10, where it is conceivable that the back rest 12 is pivotable in relation to the seating surface 10. It is furthermore conceivable that a table adjustable in position is arranged on the vehicle seat 1. Furthermore one or more arm rests (not shown) can be arranged on the seat 1.

FIG. 7b shows an enlarged view of the foot 14 of the vehicle seat 1 shown in FIG. 7a. The foot 14 consists of four connecting means 18, 20, 22, 24, wherein it is conceivable that the first connecting means 18 is separate from the seating surface 10 or formed as one piece with this. Furthermore in this depiction it is clear that the second connecting means 20 is arranged in the vertical direction below the first connecting means 18. The first two connecting means 18, 20 are spaced apart by the second connecting means 22, 24. The third connecting means 22 is formed substantially U-shaped and the fourth connecting means 24 is formed substantially S-shaped. It is furthermore clear from FIG. 7b that the second connecting means 20 can preferably be divided into several sections, namely a first section 114a, a second section 114b and a third section 114c. The second section 114b serves preferably to space the third and fourth connecting means or to connect with the third and fourth connecting means 22, 24 and thus forms preferably the proportion of the connecting means 20 which with the further three connecting means 18, 22, 24 forms the frame of the foot 14. The second section 114b, like the first and third sections 114a, 114c, can be designed to couple the vehicle seat 1 or foot 14 with the vehicle frame 112. Reference numeral 36 designates the deformation device which is preferably connected by its first end with the frame in the region of the first connecting means 18 and/or in the upper region of the fourth connecting means 24 and with its second end is arranged preferably in section 114a of the second connecting means 20 lying outside the frame. It is also conceivable that the deformation device 36 is not connected with the second connecting means 20 or its first section 114a but with the vehicle 110 and in particular the vehicle frame 112 directly.

FIG. 7b furthermore shows that the deformation device 36 is bent and thus arranged without stress.

FIGS. 8a/b and 9a/b show different inclines of the vehicle seat 1 and first connecting means 18 in relation to the second connecting means 20. These inclines result for example on an accident and in particular on a force applied from the rear to the vehicle seat 1, in particular the seat back 12. It is clear from FIGS. 7a to 9b that the greater the incline, the length of the deformation device 36 changes, in particular is extended. The third and fourth connecting means 22, 24 here carry out movements which are described in particular in a further patent application submitted by the applicant on the same day which is here by reference included in full in the object of the present patent application.

FIG. 10 shows a three-dimensional depiction of a seat lower part according to the invention. Reference numerals 113a/b designate a first foot 14 and a second foot 14, where the feet 14 are preferably spaced from each other in the vehicle width direction via struts 118a/b. The second connecting means 20 in this depiction has fixing means 116a/b for fixing the vehicle seat or the second connecting means 20 to the vehicle frame 112. Preferably the fixing means 116a/b are holes to receive bolts, wherein it is also conceivable that the second connecting means 20 can be connected with the vehicle frame 112 e.g. by means of material connection, in particular by welding. Furthermore it is clear from FIG. 10 that two deformation devices 36 are provided, wherein it is conceivable that more than two deformation devices 36 can be provided, in particular three, four or five deformation devices 36 of the same or similar design.

All features disclosed in the application documents are claimed as essential to the invention where novel individually or in combination in relation to the prior art.

LIST OF REFERENCE NUMERALS

1 Vehicle seat
10 Seating surface of 1
12 Back rest of 1
14 Foot of 1
16 Web assembly of 1
18 First web or first connecting means of 16
20 Second web or second connecting means of 16
22 Third web or third connecting means of 16
24 Fourth web or fourth connecting means of 16
26 Frame
28 Coupling or connecting point between 18 and 22
30 Coupling or connecting point between 18 and 24
32 Coupling or connecting point between 20 and 22
34 Coupling or connecting point between 20 and 24
36 Fifth web/deformation device
38 Angle between 18 and 22
40 Angle between 18 and 24
42 Angle between 20 and 22
44 Angle between 20 and 24
46 Horizontal direction
48 Vertical direction
50 End region of 36
52 End region of 36
54 Coupling point for coupling of 36 with 26
56 Coupling point for coupling of 36 with 26
58 First section of 36
102a-f Holes
104a/b Coupling devices
106a/b Wall regions
110 Vehicle
112 Vehicle frame
113a/b First foot 14, second foot 14
114a-c First to third sections of connecting means 20
116a/b Fixing means
118a/b Struts
L1 Length of deformation device 36
B1 Width of deformation device 36
H Height of deformation device 36

The invention claimed is:

1. A vehicle seat comprising a seating surface, a back rest and at least one foot supporting the seating surface, wherein the foot is formed by a connecting means assembly comprising two connecting means, namely a first connecting means and a second connecting means, each running/extending substantially horizontally, which are each coupled and held spaced in a vertical direction by means of two further connecting means, namely a third connecting means and a fourth connecting means, such that these four connecting means form a frame which can be connected with a vehicle, and that an at least one fifth connecting means is a deformation device, wherein the first connecting means is arranged in the vertical direction above the second connecting means and the third connecting means is arranged in a vehicle longitudinal direction in front of the fourth connecting means, characterised in that the at least one fifth connecting means which is a deformation device is coupled with the frame via a first connecting point in a region of the first connecting means and is coupled with the vehicle or frame via a second connecting point, wherein the deformation device between the connecting points has at least one first section in which it has, in relation to its longitudinal extent, a multiplicity of successive holes, a shape of which can be changed on movement of the first connecting point in relation to the second connecting point;

wherein the second connecting means is divided into a first section, a second section, and a third section, wherein the second section serves to space the third connecting means and the fourth connecting means, wherein the second section connects to the third connecting means and fourth connecting means, wherein the second section, the third connecting means, the fourth connecting means, and the first connecting means form the frame of the foot; and wherein the deformation device is connected to the frame in the region of the first connecting means and in an upper region of the fourth connecting means, and a second end of the deformation device is arranged in the first section of the connecting means lying outside the frame.

2. The vehicle seat according to claim 1, wherein the deformation device is longer in the deformation configuration than in a main configuration.

3. The vehicle seat according to claim 1, wherein at least two holes are of the same shape and at least partly form an elliptical shape.

4. The vehicle seat according to claim 1, wherein the deformation device in its end regions has coupling regions having slots for coupling with the frame which are oriented differently to each other.

5. The vehicle seat according to claim 1, wherein the frame formed by a first web, a second web, a third web and a fourth web defines a plane running substantially vertically.

6. The vehicle seat according to claim 5, wherein the frame formed by the first web, second web, third web and fourth web is substantially rectangular.

7. The vehicle seat according to claim 1, wherein the foot defines a plane or the first connecting means, second connecting means, third connecting means, fourth connecting means and deformation device extend substantially in a common plane or in planes lying parallel to each other.

8. The vehicle seat according to claim 1, wherein all connecting means of the frame are mobile relative to each other under a predetermined load acting on the frame, in particular such that all connecting means of the frame coupled to each other remain in a coupled state during this relative movement.

9. The vehicle seat according to claim 1, wherein the deformation device is structured such that on stretching of a region, the deformation device has a first stiffness followed by a second stiffness, wherein the second stiffness is greater than the first stiffness.

10. The vehicle seat according to claim 1, wherein the deformation device restricts the relative mobility of all connecting means of the frame which exists under a predetermined load of the frame.

11. The vehicle seat according to claim 1, wherein the frame formed by the first connecting means, second connecting means, third connecting means and fourth connecting means has a trapezoid shape.

12. The vehicle seat according to claim 1, wherein the third connecting means and fourth connecting means have base forms which differ from each other, wherein the third connecting means is U-shaped and the fourth connecting means is S-shaped.

13. The vehicle seat according to claim 1, characterized in that the second section is designed to couple the vehicle seat with the vehicle frame.

* * * * *